(12) United States Patent
Edgar et al.

(10) Patent No.: US 11,805,104 B2
(45) Date of Patent: Oct. 31, 2023

(54) COMPUTING SYSTEM OPERATIONAL METHODS AND APPARATUS

(71) Applicant: Battelle Memorial Institute, Richland, WA (US)

(72) Inventors: Thomas W. Edgar, Richland, WA (US); Thomas E. Carroll, Richland, WA (US); Garret E. Seppala, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1209 days.

(21) Appl. No.: 16/221,293

(22) Filed: Dec. 14, 2018

(65) Prior Publication Data

US 2020/0195616 A1 Jun. 18, 2020

(51) Int. Cl.
| | |
|---|---|
| H04L 9/40 | (2022.01) |
| H04L 41/0803 | (2022.01) |
| G06F 9/455 | (2018.01) |
| G06F 21/31 | (2013.01) |
| H04L 67/561 | (2022.01) |
| H04L 67/563 | (2022.01) |

(52) U.S. Cl.
CPC ...... *H04L 63/0428* (2013.01); *G06F 9/45558* (2013.01); *G06F 21/316* (2013.01); *H04L 41/0803* (2013.01); *H04L 63/102* (2013.01); *H04L 63/164* (2013.01); *H04L 63/20* (2013.01); *H04L 67/561* (2022.05); *H04L 67/563* (2022.05); *G06F 2009/45587* (2013.01)

(58) Field of Classification Search
CPC ... H04L 63/0428; H04L 63/102; H04L 63/20; G06F 9/45558; G06F 21/316
USPC .......................................................... 713/153
See application file for complete search history.

(56) References Cited

U.S. PATENT DOCUMENTS

| | | | | |
|---|---|---|---|---|
| 7,869,436 B1 * | 1/2011 | Adler | ................. | H04L 12/4641 370/392 |
| 8,281,371 B1 * | 10/2012 | Chickering | ........... | G06F 21/577 713/180 |

(Continued)

FOREIGN PATENT DOCUMENTS

CA 3060232 6/2023

OTHER PUBLICATIONS

BeyondCorp, "A New Approach to Enterprise Security", avaiable online at https://www.beyondcorp.com/, Dec. 5, 2018, 4 pages.

(Continued)

*Primary Examiner* — Samson B Lemma
(74) *Attorney, Agent, or Firm* — Wells St. John P.S.

(57) ABSTRACT

Computing system operational methods and apparatus are described. According to one aspect, a computing system operational method includes accessing user information regarding a user logging onto a computing device of the computing system, processing the user information to determine if the user information is authentic, as a result of the processing determining that the user information is authentic, first enabling the computing device to execute an application segment, and as a result of the processing determining that the user information is authentic, second enabling the application segment to communicate data externally of the computing device via one of a plurality of network segments of the computing system.

22 Claims, 6 Drawing Sheets

(56) References Cited

U.S. PATENT DOCUMENTS

| | | | | |
|---|---|---|---|---|
| 8,893,258 | B2* | 11/2014 | Rao | H04L 63/08 709/227 |
| 9,467,476 | B1* | 10/2016 | Shieh | G06F 21/554 |
| 10,097,403 | B2* | 10/2018 | Anand | H04L 12/4633 |
| 10,346,190 | B1 | 7/2019 | Sharifi Mehr | |
| 11,284,462 | B2* | 3/2022 | Samuel | H04L 12/4633 |
| 2005/0138623 | A1* | 6/2005 | Fresko | G06F 9/4843 717/124 |
| 2007/0067438 | A1* | 3/2007 | Goranson | H04L 63/1425 709/224 |
| 2009/0300350 | A1* | 12/2009 | Gai | H04L 63/0272 713/160 |
| 2010/0099405 | A1* | 4/2010 | Brisebois | H04L 41/0893 455/434 |
| 2012/0124641 | A1* | 5/2012 | Hegge | G06F 21/554 726/13 |
| 2013/0125112 | A1* | 5/2013 | Mittal | G06F 9/45558 718/1 |
| 2013/0275567 | A1* | 10/2013 | Karthikeyan | H04L 43/16 709/221 |
| 2013/0332982 | A1 | 12/2013 | Rao et al. | |
| 2014/0068711 | A1* | 3/2014 | Schweitzer, III | G06F 21/82 726/3 |
| 2014/0223536 | A1* | 8/2014 | Matsushima | H04L 63/0227 709/217 |
| 2014/0245423 | A1* | 8/2014 | Lee | H04L 63/20 726/12 |
| 2016/0006796 | A1* | 1/2016 | Matsushima | H04L 63/0227 709/217 |
| 2016/0255077 | A1* | 9/2016 | Lee | H04L 63/0272 713/159 |
| 2017/0339148 | A1* | 11/2017 | Syomichev | G06F 21/00 |
| 2018/0083837 | A1 | 3/2018 | Teng et al. | |
| 2018/0183757 | A1 | 6/2018 | Gunda et al. | |
| 2018/0375850 | A1* | 12/2018 | Hillis | H04L 9/3271 |
| 2022/0150226 | A1 | 5/2022 | Edgar et al. | |

OTHER PUBLICATIONS

Cisco, "A Framework to Protect Data Through Segmentation", available online at https://www.cisco.com/c/en/us/about/ security-center/framework-segmentation.html, Jan. 17, 2018, 9 pages.

Cryptzone, "AppGate", available online at https://www.cryptzone.com/products/appgate, Oct. 25, 2017, 6 pages.

E-ISAC, "Analysis of the Cyber Attack on the Ukrainian Power Grid", Electricity Information Sharing and Analysis Center, available online at https://www.nerc.com/pa/CI/ESISAC/Documents/E-ISAC_SANS_Ukraine_DUC_18Mar2016.pdf, Mar. 18, 2016, 29 pages.

Karle, "Operating System Containers vs. Application Containers", RisingStack, available online at https://blog.risingstack.com/operating-system-containers-vs-application-containers/, Oct. 9, 2018, 10 pages.

Kindervag, "Zero Trust: The Way Forward in Cybersecurity", available online at https://www.darkreading.com/attacks-breaches/zero-trust-the-way-forward-in-cybersecurity/a/d-id/1327827?, Jan. 10, 2017, 3 pages.

Palo Alto Networks, "Network Segmentation/Zero Trust", available online at https://www.paloaltonetworks.com/ solutions/initiatives/network-segmentation, Sep. 15, 2017, 4 pages.

Riverbed, "SteelConnect", available online at https://www.riverbed.com/document/fpo/.../steelconnect/steelconnect-datasheet.pdf, 2017, 7 pages.

Viptela, "End-to-End Network Segmentation", Use Case Scenario, 2014, United States, 3 pages.

Wikipedia, "Network Access Control", available online at https://en.wikipedia.org/wiki/Network_Access_Control, Mar. 1, 2018, 3 pages.

* cited by examiner

COMPUTING SYSTEM OPERATIONAL METHODS AND APPARATUS

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to computing system operational methods and associated apparatus.

BACKGROUND OF THE DISCLOSURE

Current cyber business environments typically include a multitude of computing systems that all communicate to achieve the business objectives. These systems may include one or more workstations where users run applications to enact the functions required to perform their roles within a business. Also, the environment typically includes one or more server systems that run network service applications to provide business or unit wide functions to generate, process, and store data. User workstations interact with server network services to execute business processes.

Business processes are multi-step sequences of events that are executed to achieve a necessary task within the context of a business. Each role within an organization is responsible for elements of business processes to achieve the overall requirements of the business objectives. A business process can span multiple users and services, where an individual user may be responsible for a subset of the overall steps of the business process.

One example of a business process is an approval system where a network service keeps track of approval requests and who is required to sign off on an approval. A user may be responsible for filling out a form to request an approval. One or more approvers may be responsible for reviewing and approving/disapproving or asking for modifications. The network services in this example are implemented by a server that tracks where in the process an approval is and what is the next step. Email service is used to notify the user or next approver of their necessary actions in one example.

Businesses process may be assessed at different criticalities based on the different types of data being generated, stored, and transmitted and their importance to the business operation. In one example business process regarding power distribution, internet research may be less important to the business and would be a low criticality while the monitoring of the power distribution is critical due to ensuring stability of system components and human safety. However, the risk posed by the general business processes is often much higher than the operator role processes because they are more often connected with external systems and users providing opportunity for malicious interactions.

Current best practice cyber security for these systems suggests that the operational systems should be completely disconnected from all other systems. However, the reality of some current business operations is that some connectivity is needed to efficiently and effectively execute the business processes. This leads to pathways for attackers to exploit to gain access into the high criticality systems, providing the means for attackers to exfiltrate, manipulate and destroy.

Attacker methodology leverages the connected systems through the expected tasks by individuals to execute business processes. Attackers leverage the paths provided by business processes to pivot or move between cyber systems in an organization and through the layers of security provided by current cyber security controls.

Application segmentation and network segmentation are general approaches to address this flaw. The weakness is that they provide seams through which attackers can still exploit the business processes to pivot around cyber systems exploiting vulnerabilities and achieving access to higher criticality systems. Network communications can be abused to pivot around application segmentation for example where an attacker desires to access the critical systems by first exploiting an email client and then leveraging the network to inject data into the communication stream between higher criticality systems.

In addition, applications on a single host that cross network segments can bypass network segments. Attackers may follow a business process to access a critical system, for example, where an attacker enters the system via web-based malware, and utilizes the email services that are utilized across all employee segments to send out emails with the next stage of the attack. An unwitting operator falls for the phishing, or fraudulent, email and the operator workstation is compromised where the attacker now has access to critical segments. Neither approach mentioned above fully prevents the ability for an attacker to pivot through a system.

At least some aspects of the disclosure are directed to computing systems and operational and communication methods thereof which provide enhanced security against attacks.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Some aspects of the disclosure are directed to an architecture, technologies, and processes which enable the mapping of application segments to network segments such that interaction and communication between certain business processes or user-defined applications and information groupings is prevented.

According to one embodiment, the computing system runs a virtual machine hypervisor technology that establishes application segmentation via creation of virtual machines for each application segment and a network utilizing a network segmentation technology. In one example, a virtual machine is provided for each application segment and a segment mapper includes configuration information to map the traffic transmitted from one of the application segment virtual machines to a specific network segment. In another aspect, an authentication/authorization service determines which users can access which application segments and which application segments can access which network segments. In one embodiment, a given application segment is only enabled to communicate data externally of a workstation via a respective one of a plurality of network segments and the application segment is not enabled to communicate data externally of the workstation via other network segments. Additional aspects, embodiments and details of the disclosure are set forth below.

Figure 1:
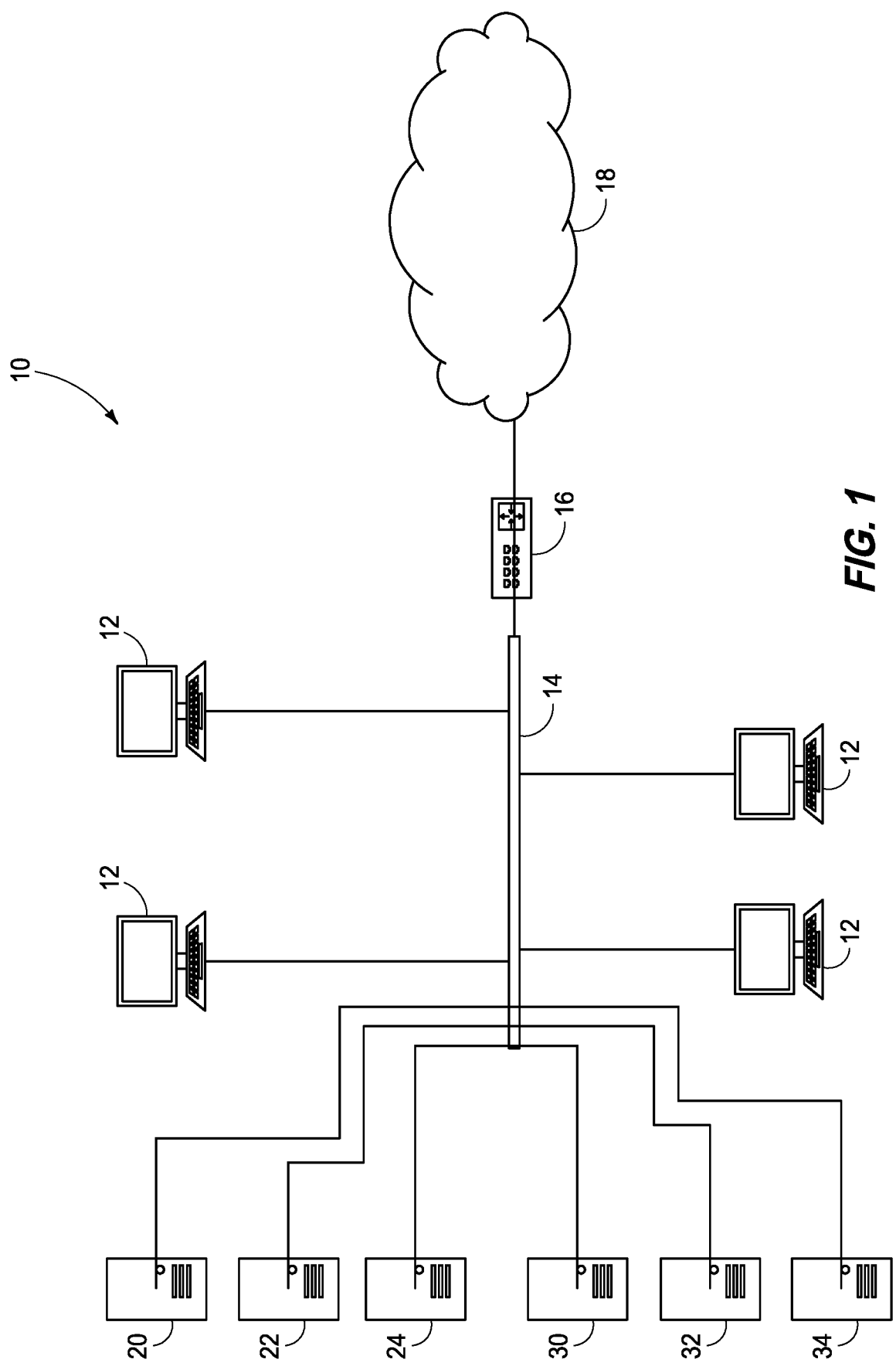
FIG. 1 is an illustrative representation of a cyber business environment according to one embodiment.

Referring to FIG. 1, an example embodiment of a cyber business environment is shown. In depicted example, the environment includes a computing system 10 which controls distribution of electrical power within an electrical power distribution system (not shown). Computing system 10 includes a plurality of computing devices which are interconnected with one another via a communications network in an illustrative example. The computing system 10 of FIG. 1 includes a plurality of workstations 12, a switch 14, a router 16, and internet services 18. The computing system 10 also includes a plurality of servers 20, 22, 24 which implement general business processes and a plurality of servers 30, 32, 34 which implement role specific business processes in the illustrated embodiment, for example with respect to the control of the distribution of electrical energy within an electrical power grid.

In one example of general business processes, server 20 implements directory services for authentication and policy mechanisms, server 22 implements email services and server 24 implements domain name services (DNS). In one embodiment of role specific business processes, such as a SCADA operation, server 30 is a client HMI tool, server 32 is an OPC server 34, and server 36 is a SCADA server.

Typically, one or more human operators are responsible for performing the general business processes like reading and responding to email, internet based research, and human resources processes such as time and billing. One or more human operators are also responsible for role specific business processes like monitoring the power distribution of a region through an HMI application and dispatching field workers for maintenance. In one embodiment, all of the above-mentioned general and role specific business processes are driven from workstations 12.

Switch 14 is configured to implement data communications between work stations 12, router 16, and servers 20, 22, 24, 30, 32, 34. Router 16 implements communications intermediate switch 14 and Internet services 18 which implements data communications of the computing system 10 with the Internet.

Figure 2:
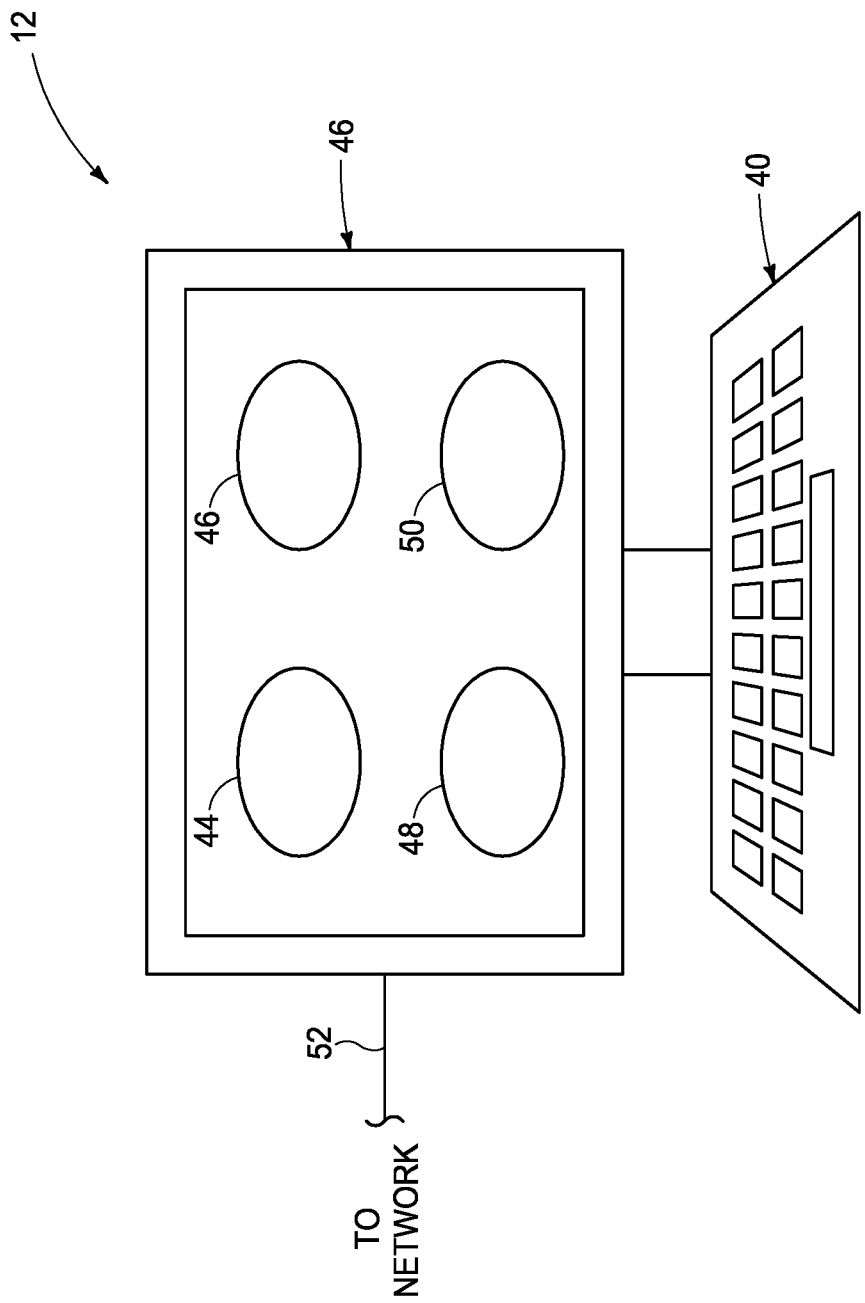
FIG. 2 is an illustrative representation of a workstation according to one embodiment.

Referring to FIG. 2, one embodiment of one of the workstations 12 is shown. Workstation 12 includes a user input device 40 and a display 42 in the illustrated arrangement. Workstation 12 executes client software to interact with the various business processes mentioned above. In one embodiment, workstation 12 includes an email client 44, a web browser 46, an HMI client 48, and an application/client for dispatching field workers 50. The workstation 12 additionally has a network interface 52 to transmit data from all of the running applications to switch 14.

Figure 3:
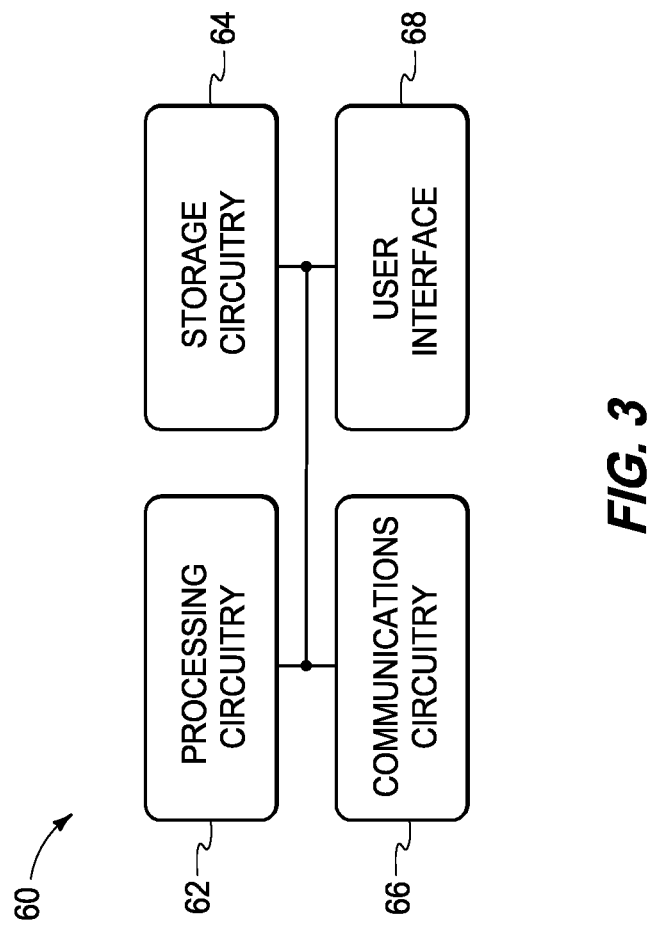
FIG. 3 is a functional block diagram of a computing device according to one embodiment.

Referring to FIG. 3, one embodiment of a computing device 60 is shown. The depicted example computing device 60 includes processing circuitry 62, storage circuitry 64, communications circuitry 66 and a user interface 68. Other embodiments of the computing device 60 are possible. In addition, one or more of the above-mentioned workstations, servers, routers, and switches of FIG. 1 may be implemented using the components of the computing device 60 shown in FIG. 3.

Processing circuitry 62 is arranged to process data, control data access and storage, issue commands, and control other desired operations. Processing circuitry 62 may comprise circuitry configured to implement desired programming provided by appropriate computer-readable storage media in at least one embodiment. For example, the processing circuitry 62 may be implemented as one or more processor(s) and/or other structure configured to execute executable instructions including, for example, software and/or firmware instructions. Other exemplary embodiments of processing circuitry 62 include hardware logic, PGA, FPGA, ASIC, state machines, and/or other structures alone or in combination with one or more processor(s). These examples of processing circuitry 62 are for illustration and other configurations are possible.

Storage circuitry 64 is configured to store programming such as executable code or instructions (e.g., software and/or firmware), electronic data, databases, and/or other digital information and may include computer-readable storage media. At least some embodiments or aspects described herein may be implemented using programming stored within one or more computer-readable storage medium of storage circuitry 64 and configured to control appropriate processing circuitry 62. The computer-readable storage medium may be embodied in one or more articles of manufacture which can contain, store, or maintain programming, data and/or digital information for use by or in connection with an instruction execution system including processing circuitry 62 in the exemplary embodiment. For example, exemplary computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications circuitry 66 is arranged to implement bi-communications of computing device 60 with respect to external devices. Communications circuitry 66 may include a network interface card and/or additional appropriate circuitry for implementing serial (e.g., RS-232, i2s, SPI, etc.), cellular, Bluetooth, WIFI, and Ethernet communications.

User interface 68 is configured to interact with a user including a display to convey data to a user (e.g., displaying visual images for observation by the user) as well as receiving inputs from the user, for example as discussed above with respect to the workstation of FIG. 2.

As mentioned above, computing system 10 is configured to authenticate users which determines whether a user is authorized to access an application segment and if an application segment is authorized to be connected to and communicate data via a network segment in one embodiment. In one embodiment, computing system 10 maps application segments with respective network segments and includes a mechanism to enforce the mappings to prevent an attacker from bypassing individual segmentation policies to protect business process applications of various risk levels while still maintaining a workstation operational model.

Figure 4:
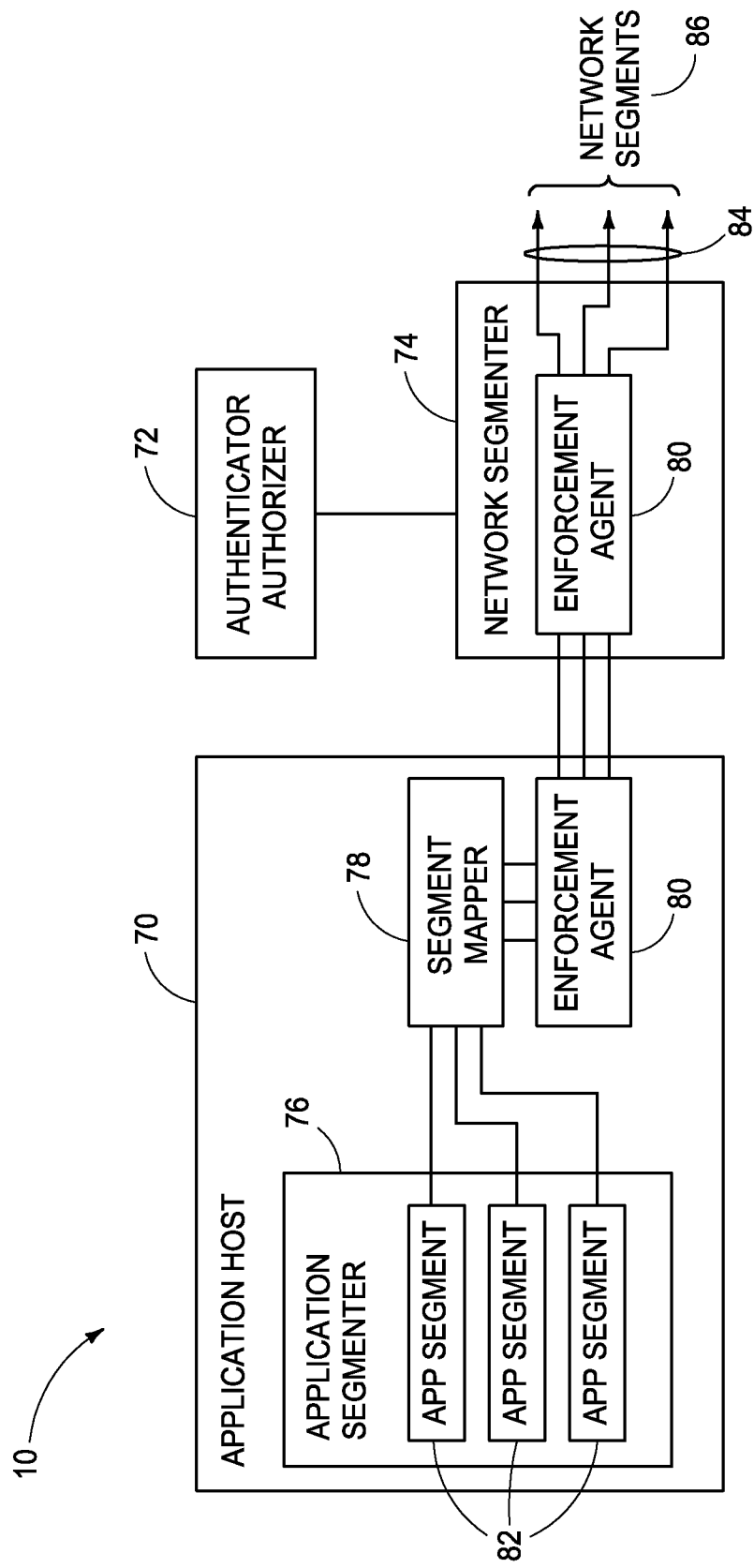
FIG. 4 is an illustrative representation of components of the computing system according to one embodiment.

Referring to FIG. 4, a plurality of components including computer hardware, network hardware and software of one example embodiment of computing system 10 are shown. The illustrated example includes an application host 70, authenticator/authorizer 72 and network segmenter 74. These components are configured in one embodiment to implement an authorization process shown in FIG. 5 for authorizing a user and establishing connections between application segments and network segments and a mapping process shown in FIG. 6 for a transmitting computing device to send data from an application segment through a network segment to a recipient computing device.

Application host 70 is a computing device which may be implemented as shown in FIG. 3 and includes the physical and software components that execute the application segmenter 76 (and a plurality of application segments 82 discussed below), a segment mapper 78 and an enforcement agent 80 in the illustrated arrangement. Application host 70 may be implemented as a workstation described above or alternatively as a laptop, cell phone, or other computing device having an operating system. A typical computing system of the disclosure includes a plurality of application hosts 70, each of which may be implemented as shown in FIG. 3 and communicate data via communications network 84

Application host 70 includes software which manages application segmentation which is discussed further below (e.g., software which is part of the operating system such as a hypervisor or additional software such as operating system virtualization). In a more specific example, the application host 70 is implemented using a QubesOS operating system running on a workstation.

In one embodiment, authenticator/authorizer 72 manages access controls of computing system 10 by authenticating the identity of an application segment executed by application host 10, determining what policy applies to that application segment and authorizing and configuring various components discussed below, such as a segment mapper, enforcement agents, and a network segmenter to connect the application segment to an appropriate one of the network segments. In one embodiment, authenticator/authorizer 72 makes the determination if a user is allowed to access an application segment (authentication operation) and if an application segment is allowed to be connected to and transmit data via a network segment (authorization operation) based on a policy in example embodiments discussed below. Once the authenticator/authorizer 72 has authorized the connection, an application segment is able to connect to and transmit data across a network segment.

In some embodiments, example authentication evidence which may be used to authenticate a user includes one or more of a password, certificate, token/dongle, and biometric information. Authentication can occur via various authentication protocols such as 802.1x, EAP, host based mechanisms, or others.

If a user is allowed to access an application segment, authenticator/authorizer 72 thereafter determines if a request for access from an application segment of a workstation accessed by the user should be allowed to connect to a network segment and transmit data using the connection and network segment. The authorization determination is based on a combination of attributes from the user, application segment, and network segment as defined by a policy in one embodiment.

In one implementation, the authenticator/authorizer 72 is implemented using a RADIUS server, a Microsoft Active Directory server and a Cisco Integrated Security Engine (ISE) policy server. The authorization operations may be implemented using Lightweight Directory Access Protocol (LDAP) in one embodiment.

Network segmenter 74 provides network segmentation including separation of the flow of and access to data on a communication network 84 in one embodiment of computing system 10. The separation provides logical segmentation of transmission of and access to data across communication network 84 creating network segments 86. Communication network 84 consists of devices that transmit data across space between two or more communicating parties which generally consists of a network of switches and routers.

In one embodiment, a policy is accessed which defines which communications are authorized to be transmitted via communication network 84 in the computing system 10. The policy may be predefined at some point in time prior to a user attempting to access one or more application segments of a workstation or prior to a user initiating an action to transmit data from an application segment using the communication network 84. The policy determines how to segment data transmitted across the network 84 in one example embodiment discussed further below.

Network segmenter 74 is implemented within network infrastructure equipment including switches and routers in one embodiment. Network segmenter 74 may be implemented in switch 14 of the example computing system 10 shown in FIG. 1. In one more specific embodiment, network segmenter 74 is implemented as a Cisco Catalyst switch with an Integrated Security Engine (ISE) and which is available from Cisco Systems, Inc. Switches enabled with an OpenFlow communications protocol or Aruba ClearPass may be used in other implementations of network segmenter 74. Network segmenter 74 provides secure network access control and zero trust networking capabilities in one embodiment. In one embodiment, a plurality of application hosts 70 access communication network 84 via a plurality of respective switches which are configured to implement network segmentation services of network segmenter 74 along with one or more routers to ensure that data is only delivered where it is allowed in accordance with the policy.

Although not shown in FIG. 4, additional components may be coupled with and transmit and receive data via communication network 84. One computing device may be a transmitting computing device which outputs data for communication via communication network and another computing device may be a recipient computing device which receives the data communicated via the communication network. In one embodiment, one network segmenter 74 may be provided to process communications prior to their transmission and another network segmenter 74 may be provided to process received communications and prior to delivery to a recipient computing device. In one embodiment, data is communicated via the communication network 84 between the computing devices using a plurality of data packets.

Referring again to application host 70, application segmenter 76 provides separation of the operation of sets of processes on application host 70. The separation provides physical or logical segmentation of all or some subset of memory, namespace, filesystem, input/output devices, and user accounts of the application host 70. Example methods of implementing an application segmenter 76 include Linux Containers, BSD Jails, Solaris Zones, micro-virtualization, and Virtual Machines, etc. Application segmenter 76 can be implemented in software, hardware, or a hybrid of both in different embodiments and the application segmenter 76 uses a plurality of application virtual machines for the execution of the application segments 82 in one more specific embodiment.

Application segments 82 are each a specific instance of an operational envelope providing the separated resources provided by application segmenter 76 for one or more processes. The smallest atomic unit for an application segment 82 is a set of processing threads and can be anything from a set of threads from a single running application up to a full virtual machine that encapsulates a set of threads running one or more applications. The threads running within a given application segment 82 have some relationship where they should share computer resources, network resources, and/or data in one example. An application virtual machine is provided for each application segment in one embodiment.

Application host 70 has a physical connection (i.e., wired or wireless) to network segmenter 74 that manages the network segmentation mentioned above. A network segment 86 is a logical separation of data transmission across a communication network 84. Each network segment 86 is defined by a policy of how a set of data will be transmitted across a network. The network segment 86 defines which computing devices can see the data, where the data will be transmitted between switches and routers, and the security mechanisms applied to protect the data (e.g., encryption). Only those application hosts 70 and application segments 76 allowed by a policy will be delivered data from a given network segment 86 in one embodiment.

In one embodiment, segment mapper 78 maps pairs of users and application segments 82 to network segments 86. In order to provide end-to-end zero trust segmentation in accordance with illustrative aspects of the disclosure, only those application segments 82 specified to work with respective network segments 86 are permitted. The segment mapper 78 may be implemented in software and/or hardware and is configured to map communications and data coming from application segments 82 to appropriate authorized network segments 86. In one more specific embodiment, segment mapper 78 is implemented using a plurality of network virtual machines although other implementations are possible including using an operating system/hypervisor driver, operating system virtualization container, hardware chip or application sandboxing. The network virtual machines are associated or mapped with respective application virtual machines according to the policy being used as described further below.

In one embodiment, multiple application segments can be mapped to the same network segment which enables applications of the same level of criticality/business process to communicate. In addition, a given application segment is only able to communicate over the network using its mapped network segment defined in the policy in accordance with one embodiment.

In one embodiment, a network virtual machine is used for each network segment 86 and a plurality of MAC addresses are created for the network virtual machines to enable application host 70 to access a plurality of different network segments over a single connection and port on network segmenter 74 and which enables network segmenter 74 to differentiate which data packets belongs to which authorized security group tag (SGT) of Cisco Trustsec technology. The MAC address of a physical network interface card (NIC) between the application host 70 and network segmenter 74 can then be protected and leveraged for system administration activities only in one embodiment.

In one embodiment, the application virtual machines of the application segmenter 76 are associated with respective ones of the network virtual machines of the segment mapper 78. Each application virtual machine has an associated network virtual machine to provide the mapping of data from the application segments to respective ones of the network segments in the described embodiment. Each network virtual machine runs a tunneled EAP (e.g., EAP-TTLS) with one or more inner EAP methods for authentication to the network and to authorize an appropriate network segment 86 for data transmission. In one more specific embodiment, FAST-EAP with MSVCHAP is utilized. An 802.1 supplicant is run on each network virtual machine and application virtual machine which provide authentication in one embodiment. In one implementation, a certificate is provided for the network virtual machine to authenticate the respective network segment. With respect to the application virtual machines, any suitable method may be used to authenticate a user, such as use of a password, token, or certificate in one embodiment.

Application segments 82 and network segments 86 have an identifier like a UUID or some other data that uniquely identifies each within an operating system. Segment mapper 78 uses these identifiers to specify which groupings of application segments 82 are mapped to appropriate network segments 86 for example according to the policy being utilized. In this example, segment mapper 78 uses the mapping in the policy to connect the data communicated from application segments 82 to the appropriate network segments 86 after receiving authorization. Additional details regarding the mapping process implemented by segment mapper 78 are discussed below with respect to FIG. 6.

Enforcement agent 80 is implemented within application host 70, network segmenter 74 or a combination of both in different embodiments. Enforcement agent 80 is configured to validate the data flowing from application segments 82 and through the network via appropriate respective network segments 86 and which are destined for respective appropriate application segments 82 of recipient computing devices (not shown in FIG. 4). Data with the correct labelling is allowed to be forwarded through the appropriate network segments 86 to appropriate application segments of the recipient computing device. Data without correct labelling can be handled in various ways such as being dropped, quarantined, logged, and/or forwarded to a designated application segment 82 or network segment 86.

As mentioned above, a policy may be utilized in some embodiments to control communications between application hosts 70 using communication network 84. In one embodiment, the policy defines or specifies which users are allowed to access which specific application segments 82, which groups of application segments 82 and network segments 86 are allowed to communicate with one another, and which computing devices can run which application segments 82. In addition, the policy may also specify what forms of evidence (what you have, are, or know) and protocols (u2f, PIV, etc.) should be used for authenticating users, devices, and application segments 82 and what security controls (encryption, monitoring, etc.) apply to individual application segments 82 and network segments 86.

The policy is accessed by the components of the computing system which utilize it, including the authenticator/authorizer 72, network segmenters 74, segment mappers 78 of application hosts 70, and enforcement agents 80. In one embodiment, the policy is managed and distributed between the respective components which utilize it. In another embodiment, the policy may be centrally managed, for example using a policy server, and distributed amongst to the appropriate components.

Figure 5:
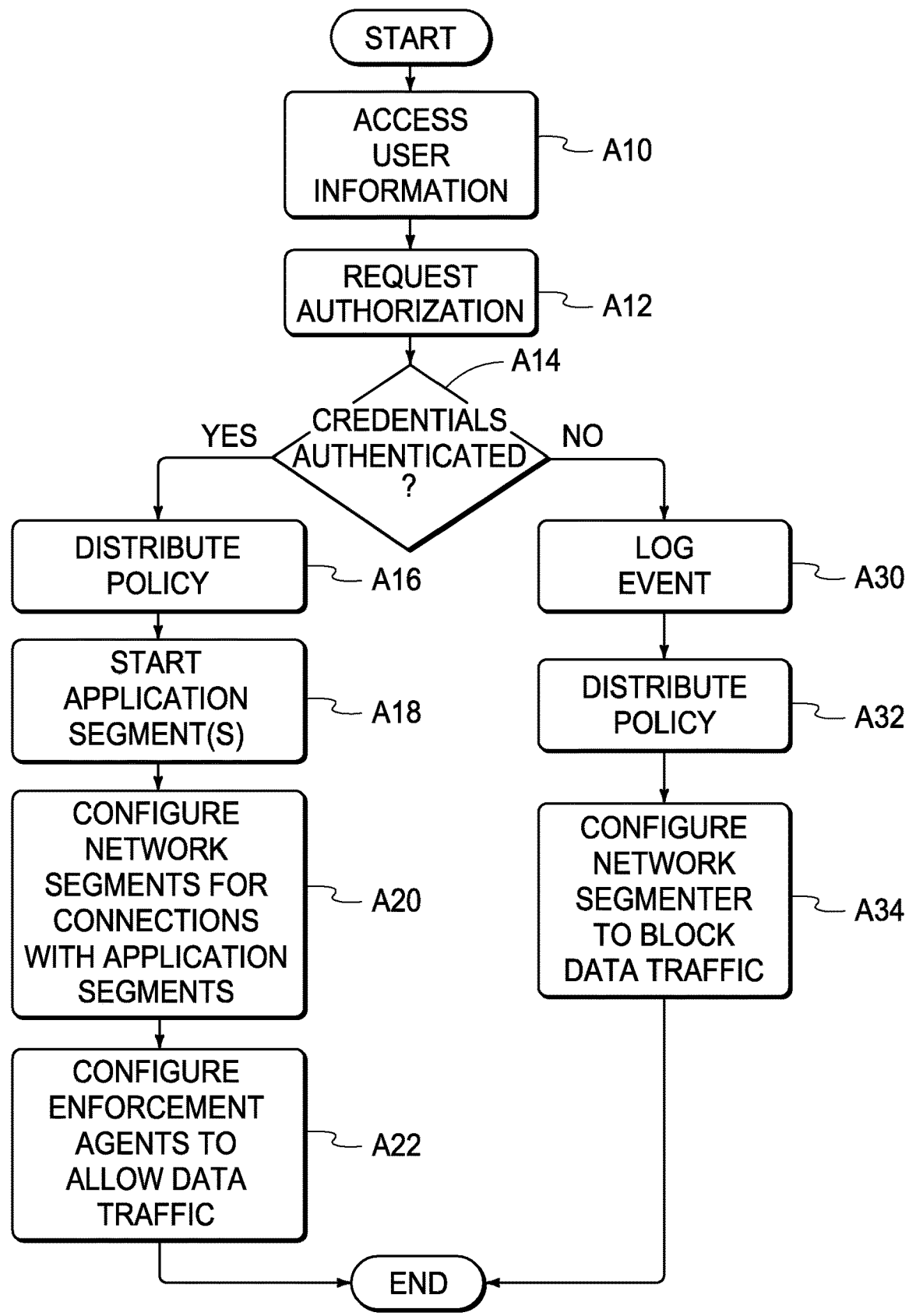
FIG. 5 is flow chart of an authentication method according to one embodiment.

Referring to FIG. 5, one method of authenticating and authorizing a user attempting to access computing system 10 via a workstation is shown according to one embodiment. The method may be implemented using a workstation, network segmenter and authenticator/authorizer in one embodiment. Other methods are possible including more, less and/or alternative acts.

Initially, at an act A10, a user inputs user information via a workstation operating as an application host discussed above. Example user information may include credentials include a username and password, certificate, a smart card, biometrics, or any other form of evidence of identity. The application host provides the necessary interfaces to receive and access the user information including whatever form of evidence of identity is utilized for credentials. The application host executes code to collect the credentials and communicates the received user information to the segment mapper.

At an act A12, the segment mapper requests authentication and authorization from the authenticator/authorizer by communicating the user information to the authenticator/authorizer. In one embodiment, a specified one of the network segments is utilized by the network segmenter to enable application hosts and segment mappers the ability to communicate the user credentials to the authenticator/authorizer to authenticate and authorize users and application segments. In one embodiment, application segments are not allowed to communicate other data apart from the user information onto the specified network segment which is utilized for authentication and authorization.

At an act A14, the authenticator/authorizer processes the user information to determine if the user information including the credentials is authentic or not as defined in the policy being utilized.

The method proceeds to act A16 if the user credentials are authentic and the authenticator/authorizer distributes a policy action to inform the appropriate components (e.g., application hosts and network segmenters) of the authenticity and authorization for the user. If the policy is centralized, the authorization will be provided from the authenticator/authorizer directly. If the policy is distributed, then the authorization occurs locally at the respective components.

In one embodiment, the workstation is enabled to execute one or more application segment(s) in accordance with the policy as a result of the user information being authentic. The application host may include one or more additional application segments which may not be accessed by the user as defined by the policy. In addition, the workstation and enabled application segment(s) are enabled to transmit data externally of the workstation via one or more respective network segment(s) as a result of the user information being authentic.

At an act A18, execution of the application segment(s) which are authorized by the policy for the user is started.

At an act A20, the network segmenter establishes data connections of the application segments(s) to respective network segment(s) in accordance with the policy and mapping wherein data is permitted to be communicated from the application segment(s) to respective network segment(s).

At an act A22, the enforcement agent is configured to allow communication of data traffic via the data connection(s) from the enabled application segment(s) to the respective network segments(s) of the communication network and the computing system is ready for operation.

If the user credentials are not authentic at act A14, then the process proceeds to act A30 where the authenticator/authorizer logs the failed authentication for subsequent use.

The authenticator/authorizer distributes a policy action to the network segmenter at act A32. The distributed policy action prevents data communications via the communication network from application segments of the application host which requested authentication at an act A34. In particular, the network segmenter is configured to quarantine or block data received from the application host being accessed by the user. Accordingly, the policy dictates what action should be taken based on a failed authentication in the described embodiment.

A more specific authentication process for allowing an application segment to connect to a network segment is described below according to one example embodiment. One example implementation utilizes an 802.1x EAP-PEAP supplicant with MSCHAPv2 within the network virtual machines. The network virtual machines are configured with a certificate as part of any normal host provisioning process (manual, domain based, etc.). The following process is used in one embodiment when authenticating for the access of an application segment to a respective network segment (for example via a Cisco Security Group Tag). A user logins into the QubesOS operating system starting the authentication process where the user provides a PIV smart card with certificates for each application segment to be utilized. The network virtual machine performs a EAP-TTLS connection to create tunneled session through the network segmenter to the RADIUS server of the authenticator/authorizer. An 802.1x supplicant running in the segment mapper performs EAP-TLS authentication using its credential certificate to authenticate itself, and the RADIUS server authorizes its access to the policy defined SGT tag which is transitioned into an authorized state for the specific communication port. Thereafter, the data packets sent by an application segment pass through the segment mapper and the data packets are modified by being encapsulated into a Cisco Trustsec packet with the configured SGT tag to ensure that they are only transmitted to the appropriate recipient computing device of the computing system.

Figure 6:
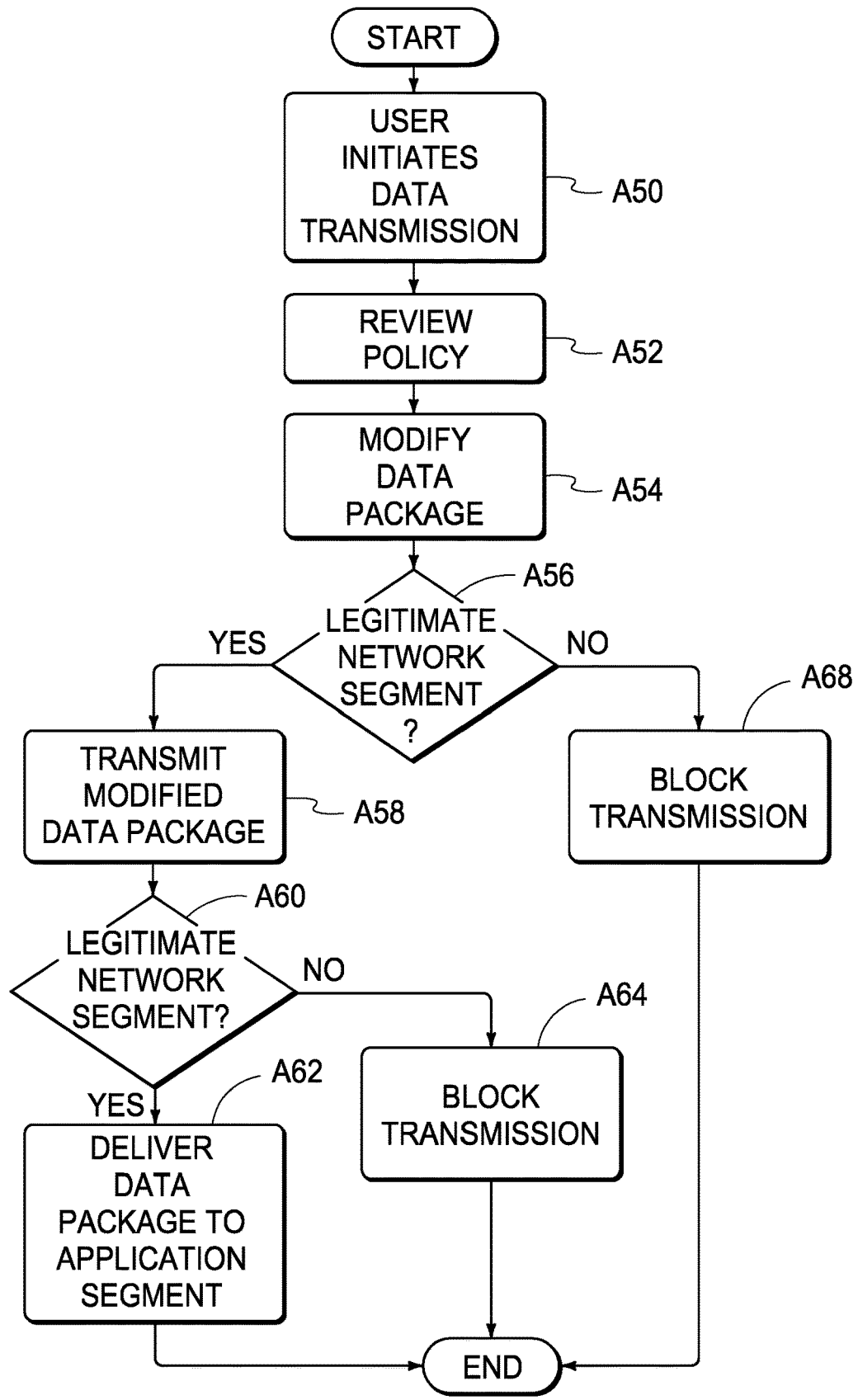
FIG. 6 is flow chart of a method of communicating data between components of the computing system according to one embodiment.

Referring to FIG. 6, a process is shown according to one embodiment for mapping an application segment with a respective network segment and implementing communication of data via the communication network from a transmitting computing device to a recipient computing device following authentication of a user. The process is implemented by the transmitting and recipient application hosts and network segmenters in one embodiment. Other methods are possible including more, less and/or alternative acts.

At an act A50, a user initiates an action to transmit data from an application segment of the transmitting computing device or application host to another application segment of a recipient computing device. For example, a user may attempt to send an email using an email service. The data is sent from the application segment of the transmitting computing device and the data identifies an application segment of the recipient computing device which is intended to receive the data.

At an act A52, the segment mapper uses the policy to determine or identify which network segment is associated with the application segment of the transmitting computing device. This configuration provides the segment mapping in the described embodiment. For example, the policy may specify that application segment A on a node of the transmitting computing device is associated with network segment C and application segment B of the recipient computing device is associated with network segment C. In one embodiment, a network virtual machine of the transmitting computing device is associated with an application virtual machine of application segment A and is configured to connect to network segment C.

At an act A54, the network virtual machine of the segment mapper modifies the data to enable communication of the data using the appropriate network segment. In one embodiment, the network virtual machine adds metadata to the data packets which identifies the appropriate network segment to be used to transmit the data packets according to the policy. The metadata informs the network segmenter of the appropriate network segment to transmit the data on. Example metadata includes a specific MAC or IP address, a network identifier, or a protocol tag such as an SGT or VLAN ID. The segment mapper transmits the modified data to the enforcement agent.

At an act A56, the enforcement agent processes the modified data to verify that the modified data is authorized for transmission from the application segment of the transmitting computing device via the determined network segment. In one embodiment, the enforcement agent determines whether the modified data includes appropriate metadata to be put on a network segment including verifying that the transmitting computing device is authorized to send external communications via the network segment identified in the metadata.

If the metadata is incorrect or not included in the modified data, then the network segmenter blocks, quarantines, or transmits the modified data to a designated network segment as defined by the policy at an act A68.

If the metadata is correct, then the network segmenter transmits the modified data at an act A58 using the appropriate network segment to the appropriate recipient computing device (e.g., destination application host running the destination application segment to receive the data).

At an act A60, the enforcement agent associated with the recipient computing device receives and processes the modified data for correctness. In one embodiment, the enforcement agent uses the policy to determine whether the metadata defines an application segment which is permitted to receive data from the network segment which transmitted the data. For example, the enforcement agent uses the modified data to identify the application segment of the recipient computing device which is to receive the data, and thereafter uses the policy to determine whether the application segment is authorized to receive the data from the network segment which communicated the data.

If the metadata is correct, then the segment mapper of the recipient computing device removes the metadata from the data and delivers the data to the appropriate destination application segment of the recipient computing device identified by the data at an act A62. The application segment receives the data and the operation is complete.

If the metadata is not correct or missing, the segment mapper of the recipient computing device blocks, quarantines, or transmits the data to a designated application segment as defined by the policy.

A more specific process for transmitting data from a transmitting computing device to a recipient computing device is described below according to one example embodiment.

As discussed above, a user initiates an action to transmit data from one application segment to another application being executed by another application host. The data is sent from the appropriate application segment virtual machine to the segment mapper which may be a layer 3 network connection provided by the QubesOS operating system interface between the application virtual machine and a respective network virtual machine. Each network virtual machine is configured per the policy on which network segment to connect to and send data to and from and this configuration provides the segment mapping discussed above.

Referring again to the example discussed above, the policy may specify that application segment A on a node is associated with network segment C and on the other host application segment B is associated with network segment C. In this arrangement, a network virtual machine of the first application host is associated with an application virtual machine of application segment A and is configured to connect to network segment C. Data outputted from the application segment virtual machine is received by the appropriate network virtual machine. The data is sent over an IP interface through the QubesOS operating system and is received by the respective network virtual machine of the segment mapper in one embodiment. The network virtual machine retransmits the data through the physical network to the network segmenter. In order to differentiate which application virtual machine sent the data and which network segment to use for transmission, each network virtual machine is configured with a specific MAC address in one arrangement that denotes which network virtual machine it originates from. This MAC address informs the network segmenter which network segment to place the data onto in this example embodiment. TrustSec from Cisco can be used between the network virtual machine and the network segmenter to provide an additional layer of security in one embodiment.

The segment mapper forwards the data to a network interface card (NIC) associated with it which encapsulates the data into an Ethernet frame with a MAC address specific to the transmitting network virtual machine. In some embodiments, media access control security (MACsec) may be used.

The network segmenter associates the MAC address with the appropriate network segment and adds the SGT to the Ethernet header. The rest of the infrastructure of the communication network checks the header to ensure the data is switched and routed to the correct end points. A recipient network segmenter 74 receives the communicated data packet and forwards the packet to a respective virtual machine of the segment mapper of the recipient computing device. The network virtual machine determines whether the SGT is appropriate for its respective application segment, and if so, forwards it to the respective application segment of the recipient computing device. Otherwise, the network virtual machine of the segment mapper drops the data packet without communication to the application segment of the recipient computing device and logs an event.

Principles of information security include isolation which provides that systems and resources (data, processes, etc.) of differing criticality should be isolated to prevent disclosure or tampering. In cases where the sensitivity or criticality of the information is high, it may be desirable to limit the number of systems on which that data are stored and isolate them, either physically or logically. Physical isolation may include ensuring that no physical connection exists between public access information resources and critical information of an enterprise or organization. When implementing logical isolation solutions, layers of security services and mechanisms should be established between public systems and secure systems responsible for protecting critical resources. The processes and files of individual users should be isolated from one another except where it is explicitly desired. For example individual users should have separate, isolated process space, memory space, and file space, with protections for preventing unauthorized access. Additionally, security mechanisms should be isolated in the sense of preventing access to those mechanisms. At least some inventive aspects of the disclosure achieve isolation security objectives by specifying or controlling which application segments can communicate with other application segments as well as controlling which network segments of a network can be used for communications by the respective application segments. Additional inventive aspects of the disclosure achieve security objectives by controlling which application segments of a workstation can be accessed by a specific user and which network segments can be used by the respective application segments accessed by the user to implement communications externally of the workstation. In some inventive aspects, a communications protocol is provided for the application segment of a transmitting workstation to communicate data to an application segment of a recipient workstation via a specified network segment.

In compliance with the statute, the invention has been described in language more or less specific as to structural and methodical features. It is to be understood, however, that the invention is not limited to the specific features shown and described, since the embodiments herein disclosed comprise examples of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A computing system operational method comprising:
   initiating an action to transmit data from an application segment of a transmitting computing device to an application segment of a recipient computing device;
   as a result of the initiating, determining one of a plurality of network segments of a communication network which is associated with the application segment of the transmitting computing device;
   after the determining, modifying the data to enable communication of the data using the one network segment;
   transmitting the modified data using the one network segment;
   receiving the modified data after the transmitting;
   processing the modified data after the receiving; and
   as a result of the processing, delivering the data to the application segment of the recipient computing device.

2. The method of claim 1 wherein the determining comprises determining using a policy which identifies the one network segment and was predefined before the initiating.

3. The method of claim 1 further comprising establishing a data connection between the application segment of the transmitting computing device and the one network segment as a result of the determining.

4. The method of claim 1 further comprising, after the modifying and before the transmitting, verifying that the modified data is authorized for transmission via the one network segment, and wherein the transmitting occurs as a result of the modified data being authorized for the transmission.

5. The method of claim 4 wherein the verifying comprises determining that the application segment of the transmitting computing device is authorized to send external communications via the one network segment.

6. The method of claim 1 wherein the processing comprises:
   identifying the application segment of the recipient computing device; and
   determining whether the application segment of the recipient computing device is authorized to receive the data from the one network segment.

7. The method of claim 6 wherein the delivering comprises delivering as a result of the application segment of the recipient computing device being authorized to receive the data from the one network segment.

8. The method of claim 1 wherein the modifying comprises adding metadata to the data which identifies the one network segment.

9. The method of claim 8 wherein the transmitting comprises transmitting as a result of the metadata indicating that the application segment of the transmitting computing device is authorized to communicate externally of the transmitting computing device using the one network segment.

10. The method of claim 8 wherein the delivering comprises delivering as a result of the metadata indicating that the data is authorized to be communicated from the one network segment to the application segment of the recipient computing device.

11. The method of claim 8 further comprising removing the metadata from the data after the processing and before the delivering.

12. The method of claim 1 wherein the application segment of the transmitting computing device is an initial application segment and the transmitting computing device executes a plurality of additional application segments, and further comprising only enabling the one network segment to communicate data from the initial application segment.

13. The method of claim 1 wherein the application segment of the transmitting computing device is an initial application segment and the transmitting computing device executes a plurality of additional application segments, and further comprising enabling the initial application segment to only communicate data via the communication network using the one network segment.

14. The method of claim 1 further comprising:
   initiating another action to transmit data from another application segment of the transmitting computing device; and
   determining another of the network segments to transmit the data from the another application segment.

15. A computer system, comprising at least one hardware processor and a memory, and wherein the computing system is configured to perform the method of claim 1.

16. The method of claim 1 wherein the plurality of network segments are configured to communicate information between the transmitting computing device and the recipient computing device.

17. The method of claim 1 wherein the determining the one network segment comprises determining using a mapping of the application segment of the transmitting computing device to the one network segment.

18. The method of claim 1 wherein the network segments are a plurality of logical separations of a plurality of data transmissions across the communications network.

19. The method of claim 1 wherein the application segment of the transmitting computing device is an initial application segment, and wherein the determining comprises accessing a mapping of the initial application segment and a plurality of additional application segments of the transmitting computing device with respective ones of the network segments and identifying the one network segment as a result of the mapping of the initial application segment with the one network segment.

20. The method of claim 1 wherein the application segment of the transmitting computing device is an initial application segment, the transmitting computing device comprises a plurality of additional application segments, and the additional application segments are only permitted to transmit data via respective other ones of the network segments of the communication network.

21. The method of claim 1 wherein the application segment of the transmitting computing device is an initial application segment, and further comprising transmitting data from another application segment of the transmitting computing device using the one network segment.

22. The method of claim 1 wherein the application segment of the transmitting computing device is an initial application segment, the transmitting computing device comprises a plurality of additional application segments, and the initial and additional application segments each comprise a plurality of executable instructions.

* * * * *